No. 773,861. PATENTED NOV. 1, 1904.
J. H. FERRIS.
MACHINE FOR MEASURING CLOTH, &c.
APPLICATION FILED FEB. 4, 1903.
NO MODEL. 2 SHEETS—SHEET 1.

WITNESSES:
M. J. Snowden
H. A. Kaufelt

INVENTOR
John H. Ferris
BY
James A. Whitney
ATTORNEY

No. 773,861. PATENTED NOV. 1, 1904.
J. H. FERRIS.
MACHINE FOR MEASURING CLOTH, &c.
APPLICATION FILED FEB. 4, 1903.
NO MODEL. 2 SHEETS—SHEET 2.
Fig. 3.
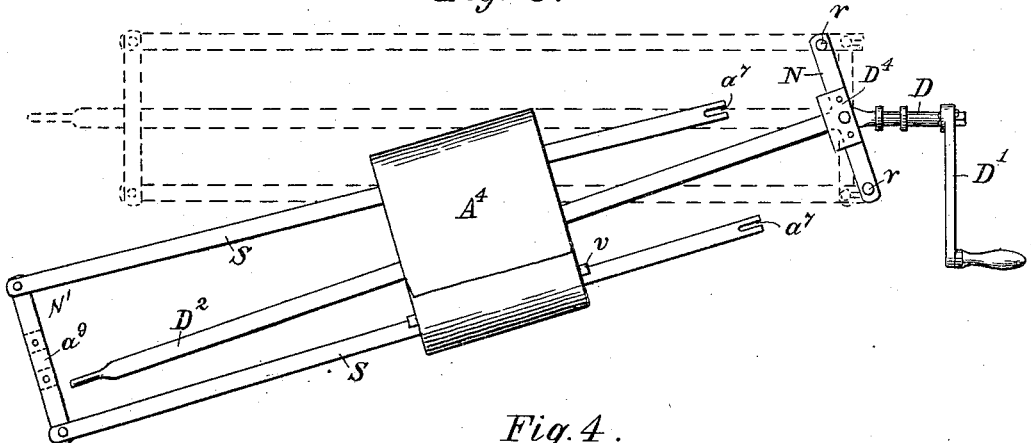
Fig. 4.
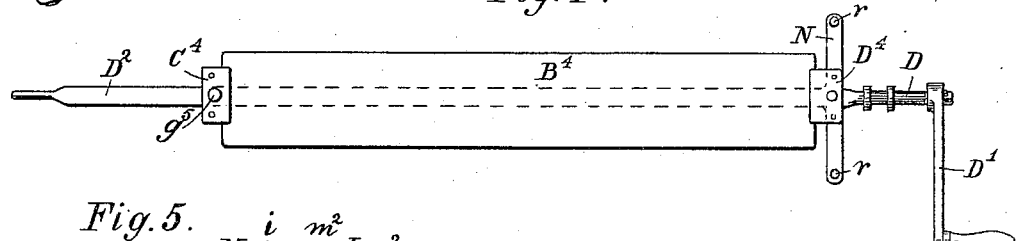
Fig. 5.
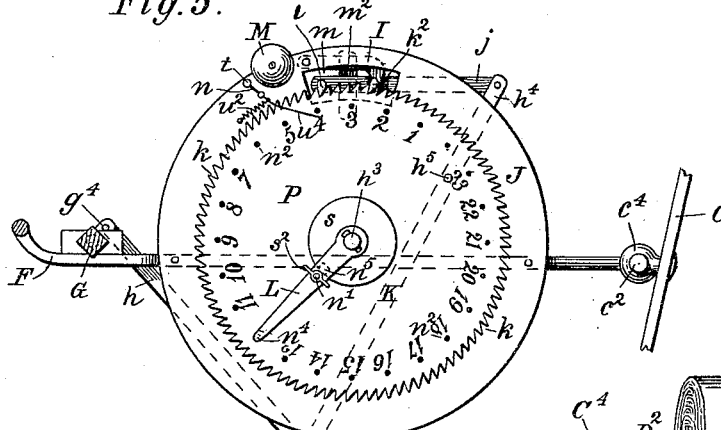
Fig. 6.
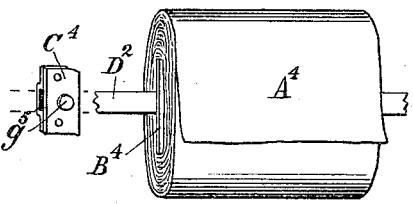
Fig. 7.
WITNESSES:
M. J. Sorowden
H. A. Kaufelt
INVENTOR
John H Ferris
BY
James A Whitney
ATTORNEY No. 773,861.

Patented November 1, 1904.

UNITED STATES PATENT OFFICE.

JOHN H. FERRIS, OF SMITH CENTER, KANSAS.

MACHINE FOR MEASURING CLOTH, &c.

SPECIFICATION forming part of Letters Patent No. 773,861, dated November 1, 1904.

Application filed February 4, 1903. Serial No. 141,800. (No model.)

*To all whom it may concern:*

Be it known that I, JOHN H. FERRIS, of Smith Center, in the county of Smith and State of Kansas, have invented certain new and useful Improvements in Machines for Measuring Cloth,&c.; and I do hereby declare that the following is a full, clear, and exact description of the same, reference being had to the accompanying drawings, making a part of this specification, in which—

Figure 1:
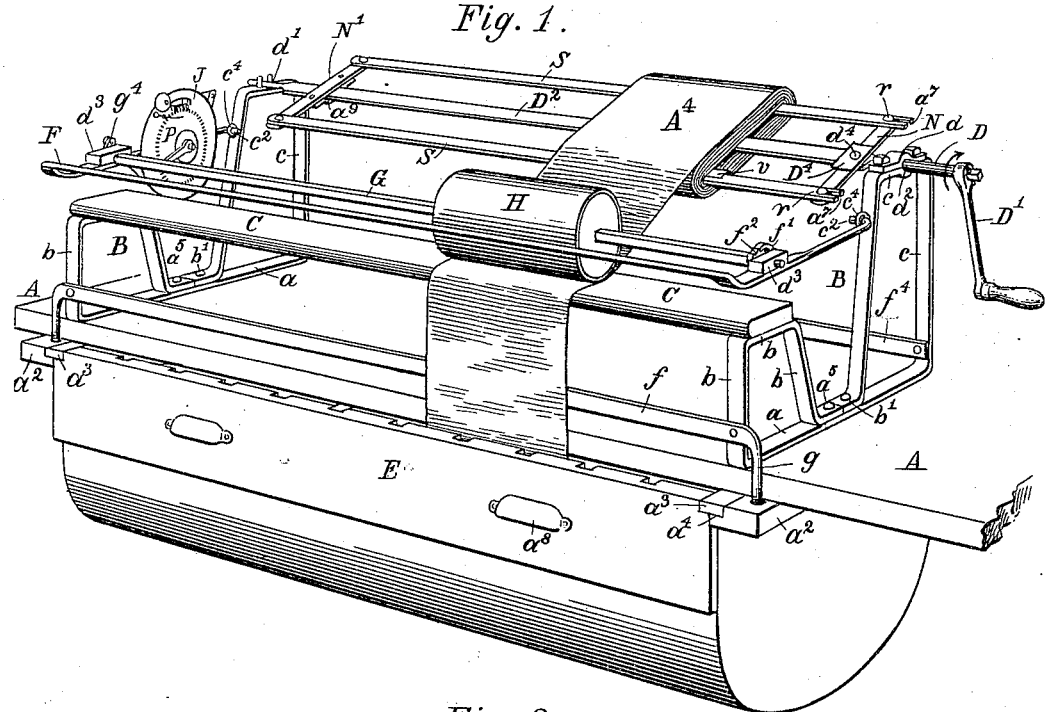
Figure 2:
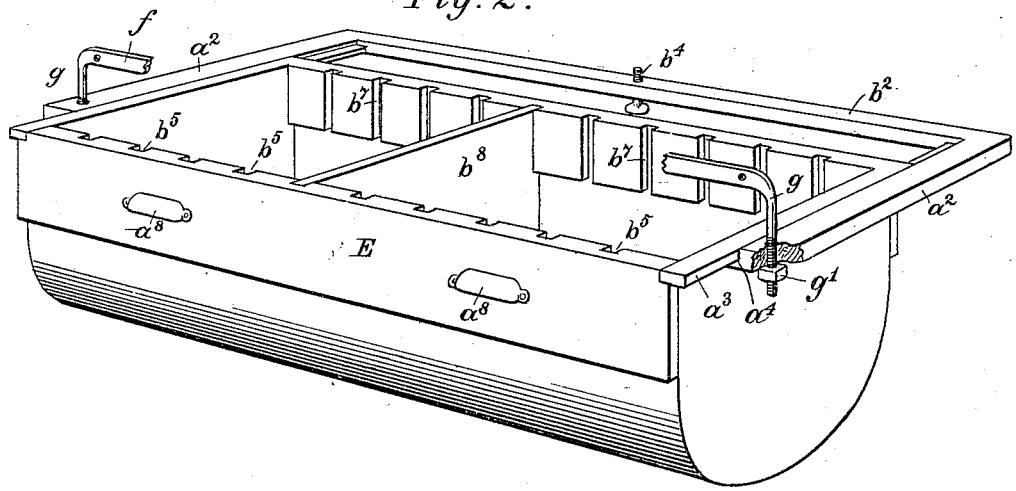

Figure 1 is a perspective view of an apparatus made according to my invention. Fig. 2 is a like view of a sliding drawer which forms part of said apparatus and which receives the sheet material preparatory to the measurement thereof. Fig. 3 is a detail view which illustrates the construction of the reel upon which the material is wound. Fig. 4 is a detail view of devices which may be applied on occasion to extend the range of utility of the said apparatus. Fig. 5 is a face view, on a larger scale, of an index-plate and adjuncts thereof which form part of said apparatus. Fig. 6 is a detail view which shows in perspective and more in detail parts which are included in Fig. 3. Fig. 7 is a transverse sectional view illustrating a further advantageous use of the reel shown in Fig. 4.

This invention is designed for the linear measurement of cloths and other sheet materials; and it comprises certain new and useful combinations of mechanical instrumentalities whereby I provide a measuring-machine which is simple, strong, and durable in construction, easily operated, accurate in its work, and adapted to all the purposes and requirements of retail and wholesale trade, stock-taking, and the like.

A is a counter, table, or other suitable horizontal support for the upper portion of the apparatus, as herein presently described. Upon this counter are placed two end frames B. These, as shown in Fig. 1, are of peculiar construction—that is to say, each is formed of a single or integral flat bar of metal, a portion $a$ of which lies flat on the counter A to form the base of the end frame, while one of its end portions $b$ is bent vertically, then horizontally, then downward, and then horizontally upon the part $a$ and bolted or riveted thereto, as at $a^5$, the other end portions $c$ of the said bar being bent upward, then substantially horizontal, then downward, and then horizontally upon the part $a$, to which it is bolted or fastened, as at $b'$. To more securely retain the two end frames B in suitable relation with each other, they may be rigidly connected by horizontal braces $f^4$ and $f$, one at the back and the other at the front of the machine. The front brace $f$ should be of metal in order that its ends may be turned vertically downward to provide hangers $g$, which at their lower ends are screw-threaded and provided with nuts $g'$.

Below the counter A are cross-pieces $a^2$, which are rabbeted at their inner edges, as shown at $a^4$. Holes are provided in the front ends of the cross-pieces $a^2$, through which are passed the hangers $g$, with their nuts $g'$ tightened against the undersides of the cross-pieces, thereby securing the cross-pieces, the counter- and the end frames B firmly together. To hold the rear ends of the cross-pieces firmly against the under surface of the counter, said rear ends are connected by a brace $b^2$, which in its turn is made fast to the counter by a bolt, which is indicated at $b^4$.

At the front of the frames B and extended from one to the other is a shelf C. Upon the upper horizontal portions of the parts of each end frame B are bearings $d\ d'$. In the bearing $d$ is supported the journal $d^2$ of a short revoluble shaft D, which may be operated by a crank D' at one end thereof. At its opposite end this short shaft D has fast upon it a spindle $D^2$, which normally is in line with it and the opposite end of which rests in a forked bearing $d'$, which affords it adequate support while in operation, but enables it to be raised up out of the bearing when occasion demands. To provide for this lifting of said spindle, there is a pivoted connection between the shaft D and the spindle $D^2$, which is more conveniently provided by flattening and overlapping their contiguous ends and pivotally connecting them by a bolt $d^4$.

To one end of the spindle $D^2$ there is made fast a cross-bar N, which has at its opposite ends knobs $r$. At the opposite end portion of the spindle is a slidable similar cross-bar N' of corresponding proportions. Bars S extend from the ends of the cross-bar N to the corresponding ends of the cross-bar N' and of course parallel with the spindle. One of these bars S is hinged at one end to one of the ends of the cross-bar N'. The corresponding end of the other bar S may be fixed to the opposite end of said cross-bar N'. The ends of the bars S which coöperate with the cross-bar N are forked or slotted, as shown at $a^7$, so that they may be longitudinally slid under the knobs $r$, and thereby firmly but detachably connected to and supported by said bar. The cross-bars and the bars S constitute a winding-reel. To permit the cross-bar N' to slide on the spindle, a slot $a^9$ is provided in the cross-bar, through which the spindle is passed. On one of the bars S is a longitudinal sheet-metal clamp $v$, the cross-section of which is shown in the detail view Fig. 7. The end of the web of cloth to be measured is slipped between this clamp and the bar to which the latter is applied, and this enables the reel to get its initial hold to wind the cloth upon the reel, as hereinafter explained.

E is a sliding drawer placed underneath the counter A and the office of which is to receive the bolt of cloth or sheet material to be measured. This drawer has at its ends cleats $a^3$, which rest in the rabbets $a^4$ of the cross-pieces $a^2$, and these support the drawer. The drawer may be fitted with handles $a^8$, whereby it may be drawn outward as occasion requires. Internally at front and back this drawer is provided with oppositely-arranged vertical grooves $b^5$ $b^7$. These grooves receive the ends of the vertical adjustable partition $b^8$. By locating the partition at any desired part along the length of the drawer the length of the space in which the bolt is situated may be regulated to keep the bolt in proper position. The bottom of this drawer is curved or semicircular in shape, as shown in Figs. 1 and 2, in order that a bolt of cloth placed therein preparatory to measurement may turn or rotate to readily yield its length to the measuring devices, as herein presently explained.

F is a swinging frame, which is pivotally connected with the end frames B, preferably by hooks $c^2$ on the rear of the swinging frame, which work in eyelets $c^4$ on the end frame, as shown in Fig. 1. The swinging frame should extend forward, so that its front is above the shelf C. This swinging frame near its front has journal-boxes $d^3$, which carry a revoluble shaft G, on which is a roll H. This shaft has a ratchet-wheel $f^2$, adjacent to which is a pawl $f'$, that while permitting the shaft G to rotate in one direction prevents it from turning the opposite way. On the opposite end of the shaft G is a crank-arm $g^4$, to the wrist-pin of which is pivoted one end of a rod $h$, Fig. 5, the opposite end of which is pivoted to one arm, $h^2$, of a lever K, the other arm, $h^4$, of which has pivoted to it a pawl $j$. This lever is fulcrumed at any suitable point along its length—as, for example, at $h^5$. The working end of this pawl comprises a lateral stop $i$, adapted to fall in successive cuts or notches $k$, formed in the circumference of an index wheel or plate P. The latter rotates upon a suitable bearing or journal $h^3$, provided on the disk J. As the shaft G, and consequently the crank-arm $g^4$, is rotated the crank-arm actuates the lever K, which in its turn causes the pawl $j$ to turn the index-wheel C. As shown in the drawings, the index-wheel moves to the extent of one of the notches $k$ with each revolution of the shaft G. To prevent a reverse movement of the index-plate, there is provided an elbow-shaped lever I, pivoted at one end and provided at the other with a lateral stop $k^2$, which drops in succession into the notches $k$ as the index-plate is intermittently rotated by the pawl $j$, the said elbow-lever in fact operating as a stop-pawl in conjunction with the notches $k$ to prevent the index-plate from turning back from the direction in which it is moved by the pawl $j$. To enable the lateral stud $i$ of the pawl $j$ and the lateral stop $k^2$ of the elbow-lever to reach and work in the notches $k$ of the index-plate, a slot or opening $m$ is provided in a disk J, which is fast to the swinging frame F behind the index-plate and which may not only serve to support the bearing of the index-plate, but which serves also to support a signal-bell M and its hammer $t$, hereinafter described. The rod, lever, and pawl work behind the disk and may be so made as to play past one another in the operation of the stud $i$ and stop $k^2$, as described. To more surely retain these parts in position, a fixed strap $m^2$ may be provided at the back of the disk J, so that the pawl $j$ and elbow-lever I may play easily between said strap and the adjacent surface of the disk.

Provided upon the face of the index-plate P is a circular or concentric series of figures or numerals which denote yards or fractions of yards or other units of measurement. Preferably the figures are placed opposite or adjacent to the notches $k$ on the circumference of the index-plate. Adjacent to each numeral or figure is an orifice or cavity $n^2$. Pivoted upon the journal $h^3$ of the disk J is a radial arm L, the outer end of which is bent upward toward the index-plate to form a spur $n^4$, which when the arm L is turned upon the hub may pass into one or another of the orifices or cavities $n^2$, and thus for the time being hold the arm in fixed relation with the index-plate and so that the said arm will rotate with the said plate. Fast upon the central part of the index-plate is a disk $s$, which lies inside of the inner part of the arm L, with its circumferential edge at a slight distance from the index-plate. Passed through the arm is the threaded shank $n'$ of a hook $n^5$, which latter holds behind the edge of the disk s. A thumb-nut $s^2$ on the shank $n'$ enables the hook to be drawn tight, thereby firmly retaining the arm in the position upon the index-plate to which it has been adjusted, as described.

M is a bell supported on the disk, and $n$ is the clapper of said bell. This clapper is pivoted at or near its middle to the disk, with its hammer $t$ in suitable relation to the bell and its downwardly-extended arm $u$ in the path of the arm L as this latter is carried around with the rotation of the index-plate. A spring $u^2$ is so applied to the arm $u$ as to bring the hammer $t$ against the bell.

In the operation of the apparatus in, for example, retailing goods the bolt of cloth $A^4$ is placed in the drawer E, the latter being opened sufficiently to permit an end portion of the cloth to be drawn out and passed upward over the front of the counter A and thence over the shelf C, under the front of the swinging frame F, and under the roll H, which latter by lifting the front of the frame F may be raised to permit the adjustment of the cloth under the roll. From the latter the said end portion of cloth is extended to the reel and its extremity secured to one of the bars S, as herein previously explained. The reel is then actuated from the shaft D and crank D' to wind the cloth thereon, the bolt readily unrolling within the drawer by means of the rounded bottom therein, as hereinbefore set forth. As the roll H rests upon the upper surface of the cloth as the latter is drawn to and upon the reel across and upon the upper surface of the said shelf, it follows that the roll revolves with a circumferential speed identical with that of the cloth passing to the reel. The rotation of the roll, which should be covered with cloth to insure a frictional hold, being transmitted to its shaft G, the crank $g^4$ on the end of the latter actuates the mechanism connected therewith, with the result that the pawl $j$ moves the index-plate the space of one notch of the index-plate for each revolution of the roll, and the circumference of the latter being known the said movement of one notch indicates on the index that a length of cloth equal to said circumference has been measured and delivered to the reel. Thus, assuming the roll to have a circumference of nine inches, or one-fourth of a yard, each movement of the space of one notch of the index-plate shows that one-fourth of a yard has been measured on its way to the reel. When it is desired that a predetermined length shall be measured from the bolt, the arm L is adjusted at that numeral or figure on the index-plate which corresponds to the length of fabric which it is desired to measure off. When in the revolutions of the index-plate this number has been measured by the revolutions of the roll, the arm L comes in contact with the arm $u$ of the hammer $t$ and brings the latter away from the bell. When the arm slips from the said arm $u$ in the continued rotation of the index-plate, the spring $u^2$ brings the clapper forcibly against the bell, and thus signals that the desired length of cloth has been measured off. When this is done, the reel is slid upon the spindle to bring the bars S away from the knobs $r$. The one bar S is then swung inward toward the other, thereby loosening the wound cloth on the said bars, as shown in Fig. 3. The end of the spindle $D^2$ is then raised from the bearing $d'$ or out of the fork $d'$, and the cross-bar N', with the bars S attached, is drawn longitudinally from the spindle, whereupon the wound and measured cloth may be readily slid off from the bars S.

To extend the range of usefulness of the apparatus to include invoicing purposes, I provide means by which the cloth may be wound upon a central board, as shown in Figs. 4 and 6, instead of upon the bars, as hereinbefore described. To accomplish this, I provide means for attaching said board to the spindle $D^2$ when occasion requires. As shown in the drawings, these means comprise a slidable clamp $C^4$ and a fixed leaf or clip $D^4$, the latter bolted fast upon the shaft $D^2$ on top of cross-bar N by two bolts. The clamp $C^4$ is constructed with a slot adapted to the cross-section of the shaft $D^2$. The board $B^4$ is placed with one of its ends underneath the clip $D^4$, which done the clamp $C^4$ is slid upon the opposite end of the board and then fixed in position by means of a thumb-screw $g^5$. In using these devices the bars S are removed in order that the cloth may wind directly upon the board. To remove the board with the cloth wound thereon, it is of course only necessary to slide back the clamp $C^4$ to release the adjacent end of the board, which done the latter may be readily slipped from the clip $D^4$.

What I claim as my invention is—

1. The combination with a suitably-supported shelf, a winding-reel, and a swinging frame pivoted adjacent to the winding-reel with its free portion extended above the shelf, of a revoluble shaft journaled at the free portion of the frame, a measuring-roll placed over the shelf to coöperate directly therewith and fast on the shaft to communicate motion to the latter, and an indicator mechanism actuated from the shaft to show multiples of the revolutions of the measuring-roll as the latter is revolved by contact with the cloth drawn below the roll across the surface of the shelf by the rotation of the reel, as described.

2. The combination with a suitably-supported shelf, a collapsible winding-reel, a driving-spindle pivotally connected with said reel, a swinging frame pivoted adjacent to said reel with its free portion extended above the shelf, a revoluble shaft journaled in said free portion of the swinging frame, a measuring-roll placed over the shelf and fast on the shaft to give motion to the latter, a drawer below the shelf from which material to be measured may be drawn by the reel between the shelf and the roll, and an indicator mechanism actuated by the shaft to indicate the revolutions of the roll when rotated by contact with the said material, as described.

3. The combination with a supporting-frame comprising end frames each formed of a bar of metal bent to provide integrally a shelf-support, bearings for a removable shaft mechanism and a base for supporting said parts, a shelf secured at its ends to the front portions of said end frames, a swinging frame which is pivoted to the back of said end frames, journal-boxes provided on the forward part of the swinging frame, a revoluble shaft journaled in said boxes, a measuring-roll fast on the shaft and placed over the shelf, a collapsible reel at the back part of the supporting-frame, a revoluble spindle for rotating the reel, a pivotal connection between the spindle and the shaft of the reel, and an open bearing for supporting the opposite end of the said shaft during the rotation of the latter and for permitting the tilting of said shaft, as described.

4. The combination with a supporting-frame comprising end frames each formed of a bar of metal bent to provide integrally a shelf-support, bearings for a removable shaft mechanism and a base for supporting said parts, a shelf secured at the ends to the front portions of said end frames, a drawer having a rounded bottom and placed below said shelf, a swinging frame which is pivoted to the backs of the end frames, journal-boxes provided on the forward part of the swinging frame, a revoluble shaft journaled in said boxes, a measuring-roll fast on the shaft and placed over the shelf, a collapsible reel at the back part of the supporting-frame, a revoluble spindle for rotating the reel, a pivotal connection between the spindle and the shaft of the reel, and an open bearing which receives the opposite end of said shaft in the rotation of the reel, as described.

5. The combination with a supporting-frame which comprises end frames each formed of a bar of metal bent to provide integrally a shelf-support, bearings for a removable shaft mechanism and a base for supporting said parts, a shelf secured at its ends to the front portions of said end frames, a drawer having a rounded bottom and internal vertical grooves and placed below the shelf, and a removable partition placed in said grooves, of a swinging frame which is pivoted to the backs of the end frames, journal-boxes provided on the forward part of the swinging frame, a revoluble shaft journaled in said boxes, a measuring-roll fast on the shaft and placed over the shelf, a collapsible reel at the back part of the supporting-frame, a revoluble spindle for rotating the reel, a pivotal connection between the spindle and the shaft of the reel, and an open bearing which receives the opposite end of the said shaft in the rotation of the reel, as described.

6. The combination with a shelf, a measuring-roll placed above the shelf, and means for indicating the revolutions of the measuring-roll, of a revoluble spindle, a cross-bar fast on one end of the spindle, a cross-bar slidable on the other end of the spindle, bars normally parallel with the spindle, each pivoted at one end to the slidable cross-bar and at the other adapted to engage with fastening devices on the fast cross-bar, a suitable bearing for the end of the spindle adjacent to the slidable cross-bar, a driving-shaft adjacent to the fast cross-bar, and a pivotal connection between the said shaft and the spindle, as described.

7. The combination with a suitably-supported shelf, a swinging frame pivoted behind the shelf and extended forward thereto, journal-boxes provided on the swinging frame, a revoluble shaft supported on said boxes, a measuring-roll fast on said shaft, and means actuated from said shaft for indicating the revolutions of the measuring-roll, of a revoluble spindle, a cross-bar fast on one end of the spindle, a cross-bar slidable on the other end of the spindle, bars normally parallel with the spindle each pivoted at one end to the slidable cross-bar and at the other adapted to engage with fastening devices on the fast cross-bar, an open bearing for the end of the spindle adjacent to the slidable cross-bar, a driving-shaft adjacent to the fast cross-bar, and a pivotal connection between the said shaft and the spindle, as described.

8. The combination with a shelf, standards for supporting said shelf, a counter for supporting said standards, a measuring-roll placed above the shelf, means for indicating the revolutions of the roll, and a horizontal brace extending from the standard at one end of the shelf to that at the other and constructed with downwardly-projecting hangers, of rabbeted cross-pieces placed below the counter and affixed thereto by the said hangers, and a drawer provided at its ends with cleats which engage with the cross-pieces to support the drawer in slidable relation with the counter, shelf and measuring-roll, as described.

9. The combination with a shelf, standards for supporting said shelf, a counter for supporting said standards, a swinging frame pivoted at its back to the standards, with its front extended to the shelf, journal-boxes on said frames, a revoluble shaft journaled in said boxes, a measuring-roll fast on said shaft, means for indicating the revolutions of the said roll actuated by said shaft, a brace extended from the standard at one end of the shelf to that at the other and constructed at its ends with pendent hangers, and rabbeted cross-pieces attached by the hangers to the under side of the counter, a slidable drawer below the counter, and cleats at the ends of said drawer which coöperate with said cross-pieces to suspend the drawer from the counter, of a revoluble spindle, a cross-bar fast on one end of the spindle, a cross-bar slidable on the other end of the spindle, bars normally parallel with the spindle, each pivoted at one end to the slidable cross-bar and at the other adapted to engage with fastening devices on the fast cross-bar, an open bearing for the end of the spindle adjacent to the slidable cross-bar, a driving-shaft adjacent to the fast cross-bar, and a pivotal connection between the said shaft and the spindle, as described.

10. The combination with a suitably-supported shelf, a winding-reel and a swinging frame pivoted adjacent to the winding-reel with its free portion extended above the shelf, of a revoluble shaft journaled at the free portion of the frame, a measuring-roll placed over the shelf, and fast on the shaft, an indicator mechanism actuated from said shaft to show multiples of the revolutions of the measuring-roll as the latter is revolved by contact with the cloth drawn between the roll and shelf by the rotation of the reel, a signal device and mechanism for actuating said device when the indicating mechanism has reached a predetermined position, as described.

11. The combination with a suitably-supported shelf, a winding-reel, and a swinging frame pivoted adjacent to the winding-reel with its free portion extended above the shelf, a revoluble shaft journaled to the free portion of the frame, and a measuring-roll placed over the shelf and fast on the shaft to communicate motion to the latter, of a pawl and ratchet to prevent reversed rotation of said shaft, a revoluble index-plate carried by the said frame, means for preventing a reverse movement of the index-plate, an arm adjustable to the several figures of the index-plate and revoluble with said plate, a signal device arranged in juxtaposition with the index-plate, and a hammer or striking device arranged to be set in action by the moving of the adjustable arm, as described.

12. The combination with a suitably-supported shelf, a swinging frame pivoted at its back with its front extended to the shelf, a revoluble shaft journaled to said boxes, a measuring-roll fast upon said shaft, a pawl and ratchet arranged to prevent a reverse motion of the shaft, a revoluble shaft behind the measuring-roll, a collapsible reel provided on said shaft of said reel, a spindle for rotating said shaft, a pivotal connection between said spindle and shaft, and an open bearing for the end of said reel-shaft remote from the spindle, of a revoluble index-plate carried by the swinging frame, means for preventing a reverse movement of the index-plate, an arm adjustable to the several figures of the index-plate and revoluble with said plate, a signal device arranged in juxtaposition with said plate, and means for actuating the signal from the arm when the plate has reached a predetermined position, as described.

JOHN H. FERRIS.

Witnesses:
H. C. SMITH,
WINFIELD SCOTT.